(12) United States Patent  
Branton (10) Patent No.: US 9,035,951 B2  
(45) Date of Patent: May 19, 2015

(54) SYSTEMS AND METHODS FOR DRAWING SHAPES WITH MINIMAL USER INTERACTION

(71) Applicant: AppSense Limited, Warrington (GB)

(72) Inventor: Paul Keith Branton, Rochdale (GB)

(73) Assignee: APPSENSE LIMITED, Warrington (GB)

( * ) Notice: Subject to any disclaimer, the term of this patent is extended or adjusted under 35 U.S.C. 154(b) by 117 days.

(21) Appl. No.: 13/922,586

(22) Filed: Jun. 20, 2013

(65) Prior Publication Data

US 2014/0375653 A1    Dec. 25, 2014

(51) Int. Cl.
*G06F 3/0484*    (2013.01)
*G06T 11/20*    (2006.01)

(52) U.S. Cl.
CPC ............ *G06T 11/20* (2013.01); *G06F 3/04842* (2013.01)

(58) Field of Classification Search
CPC ..... G06F 3/041; G06F 3/033; G06F 3/04842; G06T 11/60; G06T 1/00; G06T 2200/24; G06T 11/20
USPC .......... 345/441, 619, 157, 163, 173; 715/861, 715/769
See application file for complete search history.

(56) References Cited

U.S. PATENT DOCUMENTS

| 5,299,307 | A | * | 3/1994 | Young | 345/441 |
| 5,671,380 | A | * | 9/1997 | Hidaka | 715/861 |
| 5,956,030 | A | * | 9/1999 | Conrad et al. | 715/769 |
| 2011/0074698 | A1 | * | 3/2011 | Rapp et al. | 345/173 |
| 2011/0093790 | A1 | | 4/2011 | Maczuba | |
| 2012/0056829 | A1 | * | 3/2012 | Kasahara et al. | 345/173 |
| 2014/0351758 | A1 | * | 11/2014 | Yoshida | 715/823 |

OTHER PUBLICATIONS

"What is preemptive caching?", http://drupal.org/node/544156, Aug. 9, 2009, printed on May 28, 2013, 1 page.

* cited by examiner

*Primary Examiner* — Chante Harrison
(74) *Attorney, Agent, or Firm* — Wilmer Cutler Pickering Hale and Dorr LLP (57) ABSTRACT

Systems and methods are provided for drawing shapes with minimal user interaction. A drawing area is displayed, and a shape selection component comprising a set of shape selection regions is displayed. Each shape selection region is associated with a shape that can be drawn, and includes a selection component for selecting the shape, and a drawing component for initiating a drawing of the shape. First data indicative of a selection of a first selection component of a first shape selection region from the set of shape selection regions is received. Second data is received that is indicative of a selection of a first drawing component of the first shape selection region. A representation of a first shape associated with the first shape selection region on the drawing area is drawn, in response to the first data and the second data, wherein the representation can be manipulated.

17 Claims, 7 Drawing Sheets

SYSTEMS AND METHODS FOR DRAWING SHAPES WITH MINIMAL USER INTERACTION

TECHNICAL FIELD

Embodiments of the invention generally relate to drawing shapes with minimal user interaction.

BACKGROUND

Computerized drawing applications often allow users to use a mouse, stylus or touchscreen functionality to interact with a canvas and produce sketches of various artistic quality. Most computerized drawing applications allow the user to select different drawing objects (e.g., a text box, square, triangle, line, etc.) from a menu and draw those objects on the canvas. For example, to draw a rectangle, a user often selects the rectangle object and then draws a rectangle on the canvas by clicking a start point and dragging to set the end point. This is a three step process: (1) select the shape, (2) select the start point, and (3) select the end point.

While the three step drawing process is common across computerized drawing applications, it limits the ease and speed in which a user can draw shapes or otherwise manipulate the canvas. For example, speed and ease of use can be of particular importance when using shared/interactive whiteboards (e.g., since it is desirable for a user to quickly draw on the canvas while explaining their concept to the shared audience), or for users that need to create large presentations that require constantly switching among the various drawing tools. Therefore the user's interaction is limited to the input functionality provided by the drawing application.

SUMMARY

In accordance with the disclosed subject matter, systems, methods, and non-transitory computer-readable media are provided for drawing shapes with minimal user interaction.

The disclosed subject matter includes a computerized method for drawing shapes. The method includes displaying, by a computing device, a drawing area. The method includes displaying, by the computing device, a shape selection component consisting a set of shape selection regions, each shape selection region being associated with a shape that can be drawn on the drawing area and consisting: a selection component for selecting the shape associated with the shape selection region, and a drawing component for initiating a drawing of the shape associated with the shape selection region. The method includes receiving, by the computing device, first data indicative of a selection of a first selection component of a first shape selection region from the set of shape selection regions. The method includes receiving, by the computing device, second data indicative of a selection of a first drawing component of the first shape selection region. The method includes drawing, by the computing device in response to the first data and the second data, a representation of a first shape associated with the first shape selection region on the drawing area, wherein the representation can be manipulated.

The disclosed subject matter further includes a computing device for drawing shapes. The computing device includes a database. The computing device includes a processor in communication with the database, and configured to run a module stored in memory that is configured to cause the processor to display a drawing area. The module is configured to cause the processor to display a shape selection component consisting a set of shape selection regions, each shape selection region being associated with a shape that can be drawn on the drawing area and consisting: a selection component for selecting the shape associated with the shape selection region, and a drawing component for initiating a drawing of the shape associated with the shape selection region. The module is configured to cause the processor to receive first data indicative of a selection of a first selection component of a first shape selection region from the set of shape selection regions. The module is configured to cause the processor to receive second data indicative of a selection of a first drawing component of the first shape selection region. The module is configured to cause the processor to draw, in response to the first data and the second data, a representation of a first shape associated with the first shape selection region on the drawing area, wherein the representation can be manipulated.

The disclosed subject matter further includes a non-transitory computer readable medium. The non-transitory computer readable medium has executable instructions operable to cause an apparatus to display a drawing area and display a shape selection component consisting a set of shape selection regions, each shape selection region being associated with a shape that can be drawn on the drawing area and consisting: a selection component for selecting the shape associated with the shape selection region, and a drawing component for initiating a drawing of the shape associated with the shape selection region. The instructions are operable to cause an apparatus to receive first data indicative of a selection of a first selection component of a first shape selection region from the set of shape selection regions. The instructions are operable to cause an apparatus to receive second data indicative of a selection of a first drawing component of the first shape selection region. The instructions are operable to cause an apparatus to draw, in response to the first data and the second data, a representation of a first shape associated with the first shape selection region on the drawing area, wherein the representation can be manipulated.

The techniques described herein can reduce the number of steps required for a user to draw a shape (e.g., on a canvas), which can increase the speed in which the user can draw shapes. The drawing action can also provide for a more fluid input because the shape selection and drawing commencement is performed in the same location using a shape selection component that is invoked by an action that commences the drawing process. Such a more fluid input can increase the user's experience with the computerized drawing application.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

The techniques described herein can combine the separate drawing steps of (a) selecting a shape to draw and (b) selecting the starting point for the shape into a single action. A shape selection component can be presented to the user upon initiation of the drawing action that indicates what shapes the user can select to draw using a shape selection region for each of the shapes. While maintaining the selection (e.g., holding down a mouse button, or keeping a finger pressed on a touch-screen), the user can select a shape to draw using a shape selection component by selecting the selection component of the desired shape selection region. The user begins drawing the selected shape by selecting the drawing component of the shape selection region, which causes the display of a representation of the shape (e.g., a version of the shape that can be moved and sized by the user). Once the user is satisfied with the representation of the shape, the user can commit the shape to the drawing area.

If the user selects a particular shape to draw (e.g., a square), the user can still change to a different shape before committing the shape to the drawing area or canvas (e.g., a circle). Additionally, the user can cancel the drawing action before committing any shapes to the drawing area, even if the user selected a shape to begin drawing. For example, if the user selects a selection component, whether it be the same or a different selection component, and releases their selection, then the shape selection is cancelled and the drawing process can be ended (e.g., by a mouse, finger, stylus up action). Or, for example, a new shape can be selected by moving into a new shape selection component.

Figure 1:
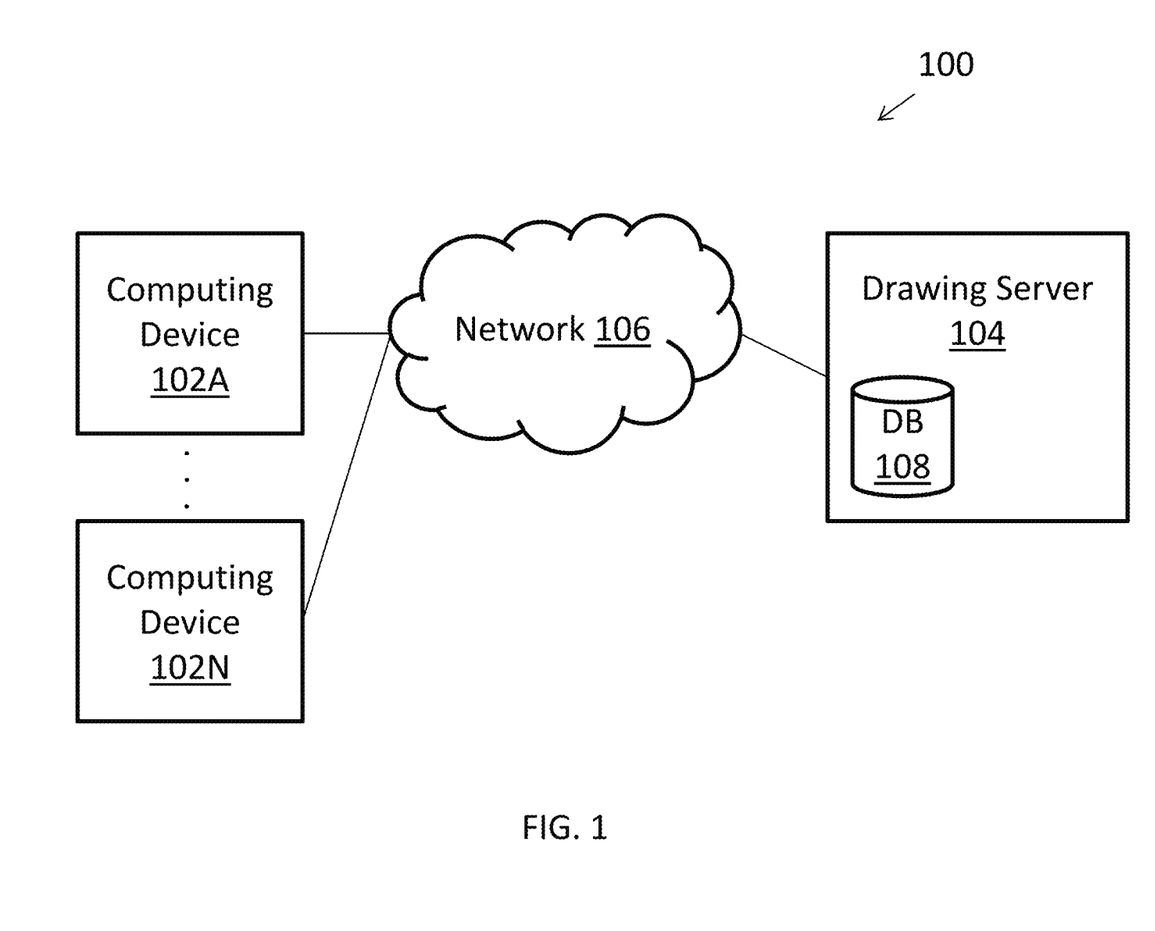
FIG. 1 is an exemplary diagram of a system for drawing shapes with minimal user interaction, according to some embodiments.

FIG. 1 is an exemplary diagram of a system 100 for drawing shapes with minimal user interaction, according to some embodiments. The system 100 includes computer devices 102A through 102N, collectively referred to herein as computer devices 102. Computing devices 102 typically include a processor and memory (not shown). Computer devices 102 communicate with drawing server 104 via network 106. Drawing server 104 includes database 108. As is explained in further detail below, the drawing server 104 can be configured to provide a shared drawing application such that the computer devices 102 can collectively access and manipulate a shared drawing area (e.g., similar to an electronic whiteboard). While some examples described herein are described using a shared drawing application, the techniques can be used in any type of application in which shapes are drawn (e.g., Microsoft PowerPoint, Microsoft Visio, Microsoft Paint, and/or the like). In some examples, the techniques are implemented in a program installed on the computing devices 102 rather than provided remotely by drawing server 104.

The communication network 106 can include a network or combination of networks that can accommodate public or private data communication. For example, the network 106 can include a local area network (LAN), a cellular network, a telephone network, a computer network, a packet switching network, a line switching network, a wide area network (WAN), any number of networks that can be referred to as an Intranet, and/or the Internet. Such networks may be implemented with any number of hardware and software components, transmission media and network protocols. FIG. 1 shows the network 106 as a single network; however, the network 106 can include multiple interconnected networks listed above.

The processors (e.g., in the computing device 102 and/or the drawing server 104) can be configured to implement the functionality described herein using computer executable instructions stored in a temporary and/or permanent non-transitory memory. The memory can be flash memory, a magnetic disk drive, an optical drive, a programmable read-only memory (PROM), a read-only memory (ROM), or any other memory or combination of memories. The processor can be a general purpose processor and/or can also be implemented using an application specific integrated circuit (ASIC), programmable logic array (PLA), field programmable gate array (FPGA), and/or any other integrated circuit. Similarly, database 108 may also be flash memory, a magnetic disk drive, an optical drive, a programmable read-only memory (PROM), a read-only memory (ROM), or any other memory or combination of memories. The drawing server 104 can execute an operating system that can be any operating system, including a typical operating system such as Windows, Windows XP, Windows 7, Windows 8, Windows Mobile, Windows Phone, Windows RT, Mac OS X, Linux, VXWorks, Android, Blackberry OS, iOS, Symbian, or other OSs. While not shown, the drawing server 104 can include a processor and/or memory.

The components of system 100 can include interfaces (not shown) that can allow the components to communicate with each other and/or other components, such as other devices on one or more networks, server devices on the same or different networks, or user devices either directly or via intermediate networks. The interfaces can be implemented in hardware to send and receive signals from a variety of mediums, such as optical, copper, and wireless, and in a number of different protocols some of which may be non-transient.

The software in the computing device 102 and/or drawing server 104 can be divided into a series of tasks that perform specific functions. These tasks can communicate with each other as desired to share control and data information throughout the computing device (e.g., via defined Application Programmer Interfaces ("APIs")). A task can be a software process that performs a specific function related to system control or session processing. In some embodiments, three types of tasks can operate within the computing devices: critical tasks, controller tasks, and manager tasks. The critical tasks can control functions that relate to the server's ability to process calls such as server initialization, error detection, and recovery tasks. The controller tasks can mask the distributed nature of the software from the user and perform tasks such as monitoring the state of subordinate manager(s), providing for intra-manager communication within the same subsystem (as described below), and enabling inter-subsystem communication by communicating with controller(s) belonging to other subsystems. The manager tasks can control system resources and maintain logical mappings between system resources.

Individual tasks that run on processors in the application cards can be divided into subsystems. A subsystem can be a software element that either performs a specific task or is a culmination of multiple other tasks. A single subsystem can include critical tasks, controller tasks, and manager tasks. Some of the subsystems that run on the computing device can include a system initiation task subsystem, a high availability task subsystem, a shared configuration task subsystem, and a resource management subsystem.

The system initiation task subsystem can be responsible for starting a set of initial tasks at system startup and providing individual tasks as needed. The high availability task subsystem can work in conjunction with the recovery control task subsystem to maintain the operational state of the computing device by monitoring the various software and hardware components of the computing device. Recovery control task subsystem can be responsible for executing a recovery action for failures that occur in the computing device and receives recovery actions from the high availability task subsystem. Processing tasks can be distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will preferably not be affected by that problem.

A shared configuration task subsystem can provide the computing device with an ability to set, retrieve, and receive notification of server configuration parameter changes and is responsible for storing configuration data for the applications running within the computing device. A resource management subsystem can be responsible for assigning resources (e.g., processor and memory capabilities) to tasks and for monitoring the task's use of the resources.

In some embodiments, the computing device can reside in a data center and form a node in a cloud computing infrastructure. The computing device can also provide services on demand such as Kerberos authentication, HTTP session establishment and other web services, and other services. A module hosting a client can be capable of migrating from one server to another server seamlessly, without causing program faults or system breakdown. A computing device in the cloud can be managed using a management system.

Figure 2A:
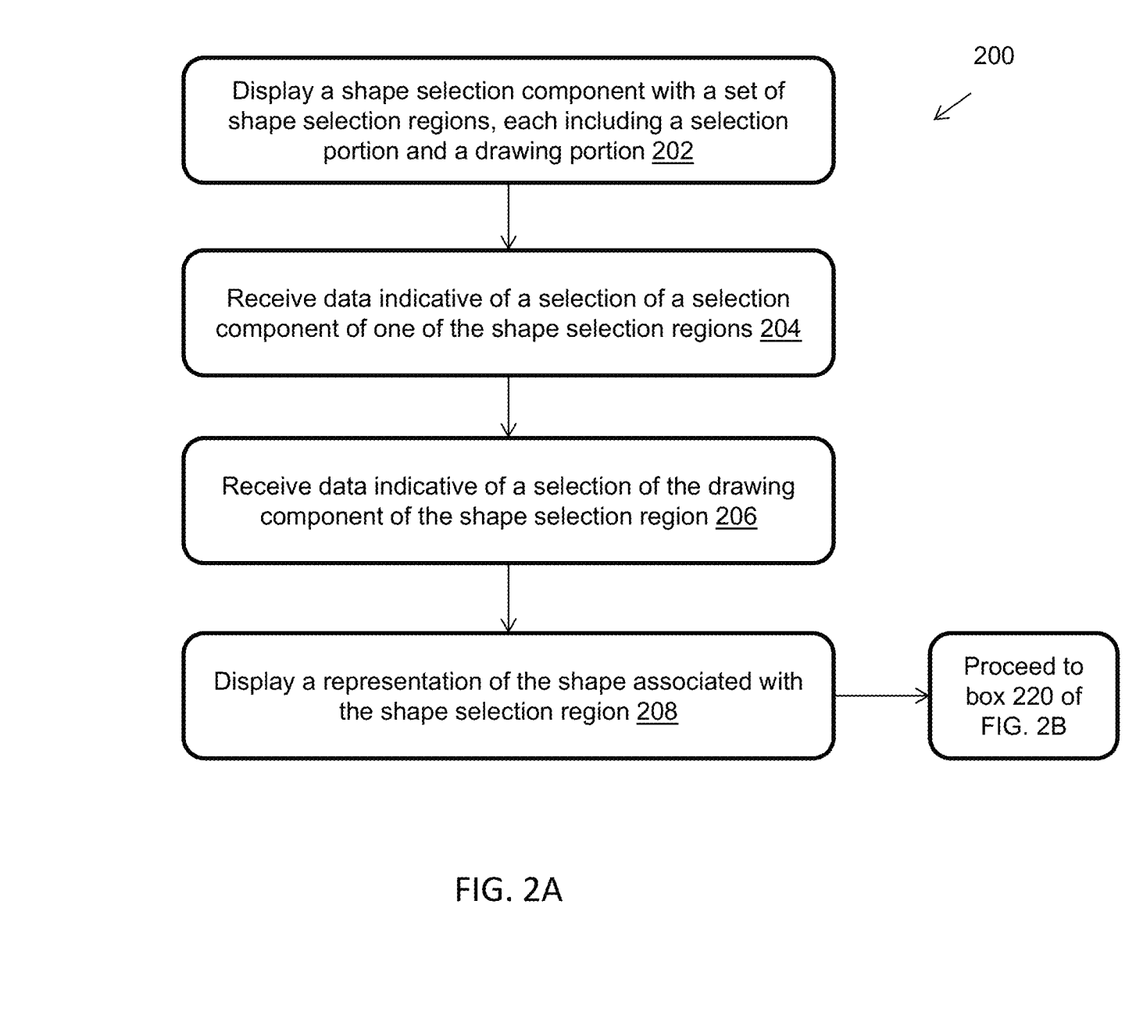
FIGS. 2A-2B are an exemplary diagram of a computerized method for drawing shapes with minimal user interaction, according to some embodiments.
Figure 2B:
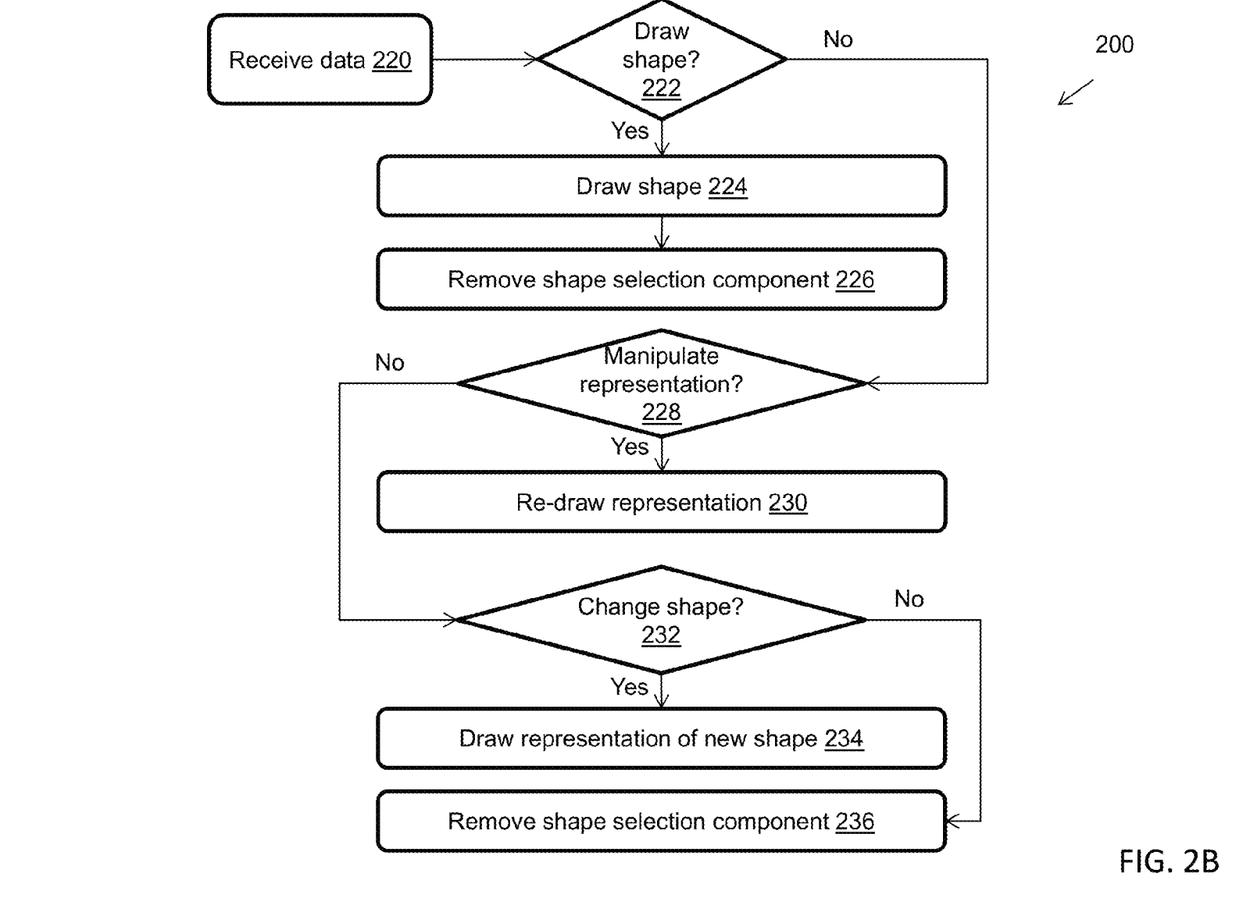

FIGS. 2A-2B are an exemplary diagram of a computerized method 200 for drawing shapes with minimal user interaction, according to some embodiments. Referring to FIG. 1, the drawing server 104 displays a drawing area on the computing devices 102. For example, the drawing server 104 can transmit HTML and/or JavaScript to the computing devices 102 that cause the computing devices 102 to display the drawing area (e.g., on a display device associated with the computing devices 102, not shown). In some embodiments, the computing device 102 executes a program that displays the drawing area on a display device associated with the computing device 102. For illustrative purposes, the computerized method 200 will be described from the perspective of the drawing server 104 shown in FIG. 1. However, one of skill in the art can appreciate that it can be the computing device 102, or some other component in communication with the computing device 102 (not shown), that executes the computerized method. For example, the computerized method 200 can be implemented by a program (e.g., a JavaScript program) being executed by an internet browser on the computing device 102, or it can be implemented by a program wholly executed on the computing device 102 (e.g., a drawing program).

At step 202, in response to a user selection the drawing server 104 displays on the computing devices 102 a shape selection component comprising a set of shape selection regions. Each shape selection region is associated with a shape that can be drawn on the drawing area, and includes a selection component for selecting the shape associated with the shape selection region and a drawing component for initiating a drawing of the shape associated with the shape selection region. The shape selection component is described in further detail below.

At step 204, the drawing server 104 receives data indicative of a selection of a selection component of a shape selection region from the set of shape selection regions. At step 206, the drawing server 104 receives data indicative of a selection of a drawing component of the shape selection region. At step 208, the drawing server 104 displays on the computing devices 102, in response to the data received in steps 204 and/or 206, a representation of the shape associated with the shape selection region on the drawing area. The representation can be manipulated, compared to a shape that is actually drawn on the drawing area. The method 200 proceeds to box 220 of FIG. 2B.

At step 220, the method 200 receives data (e.g., based on a cursor movement, a mouse click, a finger swipe, etc.). At step 222, the drawing server 104 determines whether the received data is indicative of a command to draw a shape. If the drawing server determines the received data is indicative of a command to draw a shape, the method 200 proceeds to step 224 and the drawing server 104 draws the shape on the canvas such that it is committed to the drawing area and the drawing cannot be manipulated. At step 226 the drawing server 104 removes the shape selection component 226 (e.g., such that it is no longer displayed on the computing device 102).

If the drawing server 104 determines the received data is not indicative of a command to draw a shape, the method 200 proceeds to step 228. At step 228, the drawing server 104 determines whether the received data is indicative of a command to manipulate the representation (e.g., to move or to re-size the representation of the shape). If the drawing server 104 determines the received data is indicative of a command to manipulate the representation, at step 230 the drawing server 104 re-draws the representation on the canvas (e.g., based on the center of the shape selection component 300 and the location of the cursor or other input device). If the drawing server 104 determines the received data is not indicative of a command to manipulate the representation, the method proceeds to step 232.

At step 232, the drawing server 104 determines whether the received data is indicative of a command to change the shape of the representation (e.g., to move or to re-size the representation of the shape). If the drawing server 104 determines the received data is indicative of a command to change the shape, at step 234 the drawing server 104 draws the representation of the new shape on the canvas (e.g., switching from a circle to a square). If the drawing server 104 determines the received data is not indicative of a command to change the shape, the method proceeds to step 236 and if the data is indicative of a command to remove the selection component, the drawing server 104 removes the selection component without drawing a shape (e.g., and any representation associated with the drawing component).

Figure 3A:
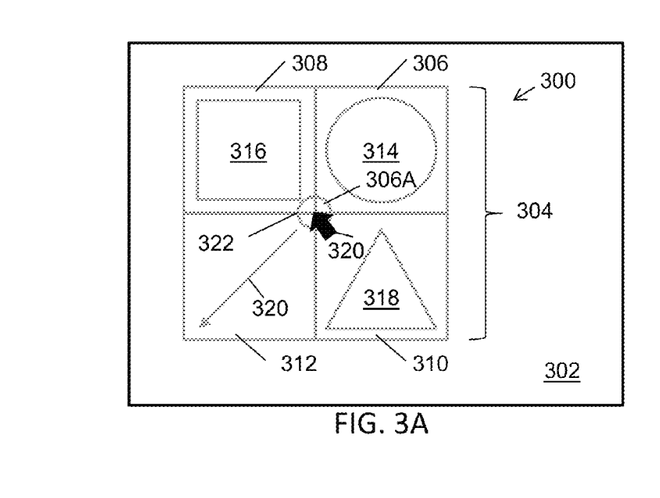
FIGS. 3A-3D are exemplary diagrams of a drawing a shape with minimal user interaction, according to some embodiments.

Referring to step 202, an exemplary shape selection component 300 is shown in FIG. 3A. The shape selection component 300 can be a semi-transparent menu used to draw a shape. The shape selection component 300 is superimposed on the canvas 302 (or other drawing surface, and/or if it is larger than the canvas it may be superimposed on other items in the window such as buttons, menu-items, other windows displayed on the computer, and/or the like). The drawing server 104 can display the shape selection component in response to, for example, a mouse button being pressed and held down by the user, a mouse click (e.g., a mouse button being pressed and depressed), a finger being placed in contact with a touchscreen and being held in contact with the touchscreen, a finger tap, and/or the like. The drawing server 104 can display the shape selection component such that it is centered about the invoking action (e.g., centered about the mouse cursor, or centered about the user's contact point on the touchscreen). Therefore the same action used to invoke the shape selection component also sets the starting point for drawing whatever shape the user selects from the shape selection component.

The shape selection component 300 includes a large square portion 304 that defines the outer boundary of the shape selection component. The large square portion 304 includes four small square portions 306, 308, 310 and 312 that are inside of the large square portion 304. Each of the small square portions 306, 308, 310 and 312 represent a shape selection region. For example, shape selection region 306 can be used to draw a circle, as indicated by the circle 314 that is displayed in the shape selection component 300. Shape selection region 308 can be used to draw a square, as shown by the square 316 that is displayed in the shape selection component 300. Shape selection region 310 can be used to draw a triangle, as shown by the triangle 318 that is displayed in the shape selection component 300. Shape selection region 312 can be used to draw an arrow, as shown by the arrow 320 that is displayed in the shape selection component 300.

As shown in FIG. 3A, the shape selection component 300 is configured such that the four shape selection regions 306, 308, 310 and 312 are arranged in a grid fashion. For example, the top and right sides of the shape selection region 306 are along the outer boundary of the shape selection component 300 (e.g., such that they are along the top and right sides of the large square portion 304). Similarly, each of the four shape selection regions 306, 308, 310 and 312 is adjacent to two other shape selection components. For example, the left side of the shape selection region 306 is along the right side of the shape selection region 308, and the bottom side of the shape selection region 306 is along the top side of the shape selection region 310. Each of the shape selection regions 306, 308, 310 and 312 include a corner that meets with a corner from each of the remaining shape selection regions at the center of the shape selection component 300, which is pointed to by the cursor 320. Thus, the shape selection component 300 can be presented so a user can easily select one of the four shapes while also setting the start point for drawing the figure, as indicated by the location of the cursor 320.

The shape selection component 300 includes a circle 322 that is centered about the center of the shape selection component 300 where the corners of the shape selection regions 306, 308, 310 and 312 meet. As is further described below, the portion of each of the four shape selection regions 306, 308, 310 and 312 within the circle 322 defines the selection component for selecting the shape associated with the associated shape selection region. For example, if the cursor 320 is placed in the selection component 306A of the shape selection region 306, the drawing server 104 sets the selected shape to a circle (e.g., but does not yet draw a representation of a circle on the canvas 302). The remaining portion of each of the shape selection regions 306, 308, 310 and 312 that is not within the circle 322 defines the drawing component for drawing the shape associated with the shape selection region. For example, after the cursor is in the selection component 306A, when the cursor is moved into the remaining portion of the shape selection region 306 the drawing server 104 can draw a representation of the circle (e.g., based on the location of the cursor 320). This process is explained in further detail herein.

The layout of the shape selection component 300 is meant to be exemplary only. For example, the shape selection component can use various shapes for (a) the large square portion 304 (e.g., a circle, a triangle, etc.), (b) the shape selection regions 306, 308, 310 and 312, and (c) the circle 320 without departing from the spirit of the invention. The shape selection component 300 can also include any number of shape selection regions (e.g., two, three, four, and/or the like). The selection component and drawing component of each shape selection component 300 can also be arranged in different locations without departing from the spirit of the invention (e.g., on the outer corner of each shape selection component).

Different shapes can be associated with the shape selection components. The selection of shapes available could be changed through a range of selections using, for example, a menu selection or an on screen interaction such as a double tap. For example, the drawing server 104 can display different buttons to the computing devices 102 that allow the user to change the set of shapes that can be drawn using the shape selection component. For example, the set of shapes can be a circle 314, a square 316, a triangle 318, and a line with an arrow 320, as shown in FIG. 3A. A first button can be selected to choose this set of shapes. Another button can be selected to change the set of shapes to a different set of shapes (e.g., a line with no arrows, a line with arrows on both ends of the line, a hexagram, a star, and/or any other shapes that can be drawn using a drawing application).

The drawing server 104 can receive the data indicative of a selection of the selection component based on various interactions with the shape selection component 300. For example, if the shape selection component was invoked with a mouse button being pressed and held down, the data can be indicative of the mouse cursor being moved into the selection component while the mouse button is still held down. As another example, if the shape selection component was invoked by a contacting element being placed into contact with a touchscreen (e.g., a user's finger, a stylus, etc.) and held in contact with the touchscreen, the data can be indicative of the contact point being moved into the selection component while contacting element remains in contact with the touchscreen. As another example, if the shape selection component was invoked with a mouse button being clicked (pressed and depressed), the data can be indicative of the mouse cursor being clicked in the selection component.

Referring to step 206, similar to step 204 the drawing server 104 can receive data indicative of a selection of a drawing component based on various interactions with the shape selection component 300. Once the drawing action is invoked and a representation of a shape is initiated, the shape selection component 300 can become transparent (or more transparent) since the representation is drawn on the canvas. For example, if the shape selection component was invoked with a mouse button being pressed and held down, the data can be indicative of the mouse cursor being moved into the drawing component while the mouse button is still held down. As another example, if the shape selection component was invoked by a contacting element being placed into contact with a touchscreen (e.g., a user's finger, a stylus, etc.) and held in contact with the touchscreen, the data can be indicative of the contact point being moved into the drawing component while contacting element remains in contact with the touchscreen. As another example, if the if the shape selection component was invoked with a mouse button being clicked (pressed and depressed), the data can be indicative of the mouse cursor being clicked in the drawing component.

Figure 3B:
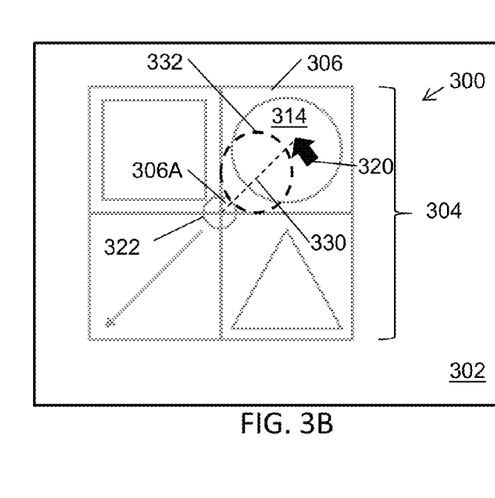

Referring to step 208, FIG. 3B is an exemplary diagram of drawing a shape with minimal user input. Some of the reference characters from FIG. 3B were removed from FIGS. 3B-3C for ease of viewing, but apply to 3B-3C as well. Line 330 (e.g., which is not actually displayed on the canvas, but instead is used for illustrative purposes) represents the path of travel of the cursor 320 from when the cursor 320 invoked the shape selection component 300. The cursor 320 traveled first through the selection component 306A, and then into the drawing component of the shape selection region 306. The drawing server 104 loads as the currently selected shape the circle 314. When the drawing server 104 receives data indicating the selection of the drawing component of the shape selection region 306, the drawing server 104 displays on the computing devices 102, in response to the data received in steps 204 and/or 206, a representation of the circle 332.

Figure 3C:
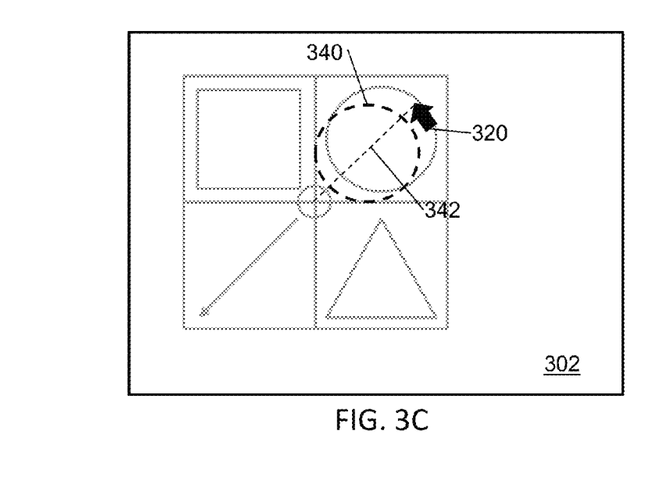

The representation can be manipulated, compared to a shape that is actually drawn on the drawing area. For example, as the input device (e.g., computer mouse, touchpad, etc.) is moved along the screen, the representation can re-draw itself based on the input device. For example, FIG. 3C shows the representation of the circle 332 from FIG. 3B redrawn to the representation of the circle 340, which is larger than the representation 332, based on the cursor movement indicated by line 342 (e.g., which is not actually displayed on the canvas, but instead is used for illustrative purposes). As another example, if the cursor 320 of FIG. 3C extends beyond the large square portion 304, the drawing server 104 can continue to re-draw the representation of the circle (e.g., such that the representation of the circle extends beyond the large square portion 304).

In some embodiments, the size of the shape could be preset so that adding a shape would be even simpler since only the start point and shape need to be selected (e.g., rather than sizing of the shape as well, as shown in FIGS. 3B-3C).

Referring to steps 222-226, the drawing server 104 determines whether the received data is indicative of a command to draw a shape. For example, the drawing server 104 can be configured such that the shape selection component 300 is invoked by a mouse press (and hold), the selection component and drawing component are selected by movement of the cursor, and the data indicative of a command to draw the shape is a mouse depress. As another example, the drawing server 104 can be configured such that the shape selection component 300 is invoked by a user placing (and holding) an input device in contact with the touchscreen, the selection component and drawing component are selected by movement of the input device, and the data indicative of a command to draw the shape is a removal of the input device from the touchscreen.

Figure 3D:
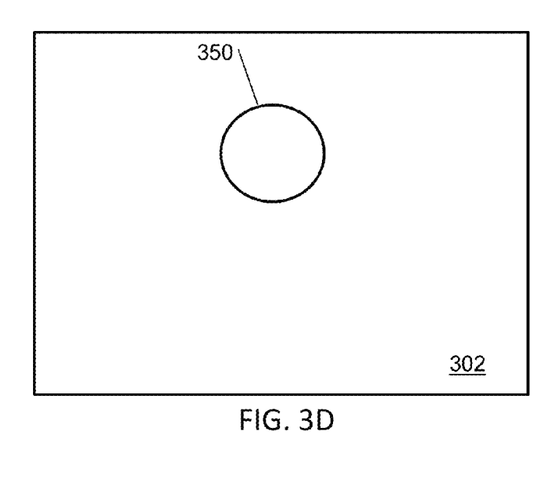

Referring to steps 224 and 226, the drawing server 104 determines the received data is indicative of a command to draw a shape and draws the shape on the canvas such that the drawing cannot be manipulated. The drawing server 104 removes the shape selection component 226 from the display so that it is no longer displayed on the computing device 102. Referring to FIG. 3D, for example, upon receipt of the data, the drawing server 104 removes the shape selection component 300 from view, and draws circle 350. In some embodiments, unlike the representation of the circle 322 in FIG. 3B and 340 in FIG. 3C, the circle 350 cannot be re-drawn or otherwise manipulated by the user (e.g., rather, the user must delete the circle 350 and start the drawing process over). As shown in FIG. 3D, the circle 350 can be displayed with a solid line, while the representations of the circle can be displayed with dotted lines. Similarly, for ease of use the shape selection component can be displayed using a light color (e.g., gray), or can be semi-transparent to allow the user to easily see the canvas, and any other objects already drawn on the canvas, behind the shape selection component.

Referring to FIGS. 3A-3D, for example, the user can invoke the shape selection component 300 by pressing and holding a mouse button. The user can select and draw the representation of the circle 332 as shown in 3B by continuing to hold the mouse button down and moving the cursor along the line 330 (e.g., such that the representation 332 is drawn based on the point that invoked the shape selection component 300 and the current location of the cursor 320). The user can re-size the representation of the circle 332 to the representation 340 shown in FIG. 3C by continuing the motion of the cursor 320 as shown by the line 342. The user can commit the circle 350 to the drawing areas as shown in FIG. 3D by releasing the pressed mouse key.

Referring to steps 228-230, the drawing server 104 determines whether the received data is indicative of a command to manipulate the representation. For example, as described above with respect to FIG. 3C, the representation of the circle 332 from FIG. 3B is redrawn to the representation 340 based on the movement of the cursor 320 shown by line 342. The representation can be manipulated by moving the representation, re-sizing the representation, and/or the like.

Referring to steps 232-234, the drawing server 104 changes the shape of the representation based on the user's input. For example, the shape selection component can be configured such that a user can initiate a drawing of a representation of a first shape, and before drawing the actual shape, the user can change the shape, size, location, etc. and draw a representation of a different shape. In some embodiments, such functionality can make it easy for a user to change shapes in the middle of a drawing process with minimal action. For example, once the shape selection component 300 is invoked, movement of the mouse cursor (or movement of the input device on the touchscreen, etc.) alone can be sufficient to select among the different selection components and drawing components of the shape selection component 300.

Figure 4A:
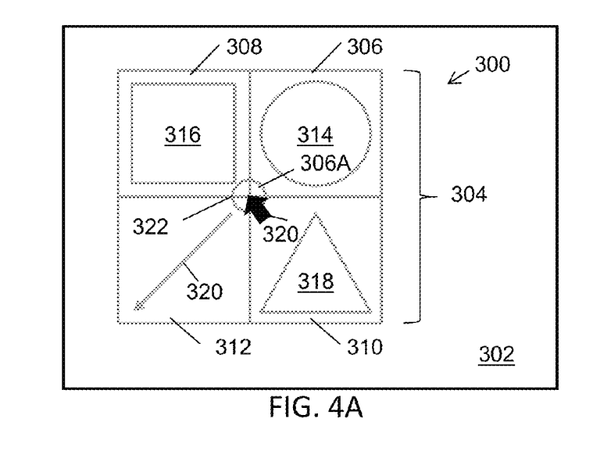
FIGS. 4A-4F are exemplary diagrams of switching from a first shape to a second shape with minimal user interaction, according to some embodiments.

FIGS. 4A-4F are exemplary diagrams of switching from a first shape to a second shape with minimal user interaction, according to some embodiments. FIG. 4A shows, similar to FIG. 3A, the shape selection component 300 superimposed on the canvas 302. The shape selection component 300 includes a large square portion 304 that defines the outer boundary of the shape selection component. The large square portion 304 includes four small square portions, including shape selection regions 306 and 310 that are inside of the large square portion 304. Shape selection region 306 can be used to draw a circle, as indicated by the circle 314 that is displayed in the shape selection component 300. Shape selection region 308 can be used to draw a square, as shown by the square 316 that is displayed in the shape selection component 300. Shape selection region 310 can be used to draw a triangle, as shown by the triangle 318 that is displayed in the shape selection component 300. Shape selection region 312 can be used to draw an arrow, as shown by the arrow 320 that is displayed in the shape selection component 300.

Figure 4B:
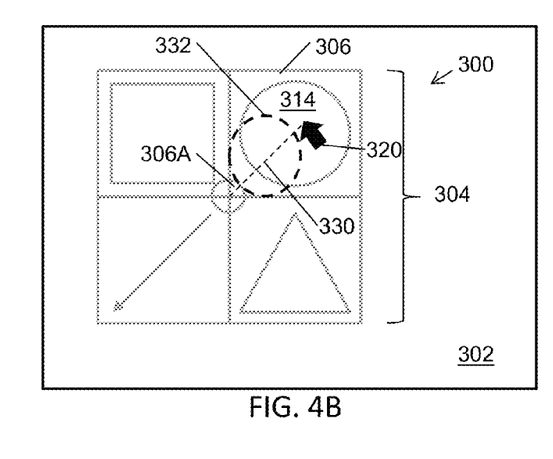

FIG. 4B shows, similar to FIG. 3B, line 330 which represents the path of travel of the cursor 320 from when the cursor 320 invoked the shape selection component 300. The cursor 320 traveled first through the selection component 306A, and then into the drawing component of the shape selection region 306. The drawing server 104 loads as the currently selected shape the circle 314. When the drawing server 104 receives data indicating the selection of the drawing component of the shape selection region 306, the drawing server 104 displays on the computing devices 102, in response to the data received in steps 204 and/or 206, a representation of the circle 332.

Figure 4C:
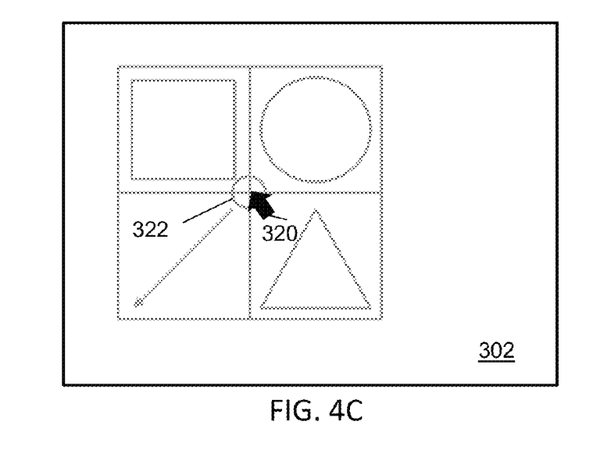

FIG. 4C shows movement of the cursor 320 back to the original position (e.g., or into any one of the selection components) such that a selection component is invoked (e.g., via movement of the cursor, a mouse click, etc.). Such selection causes the drawing server 104 to remove the representation of the circle 332 from the canvas 302. Such an action serve as, for example, a re-set or a re-start of the drawing operation, or terminates the drawing action without drawing the shape.

Figure 4D:
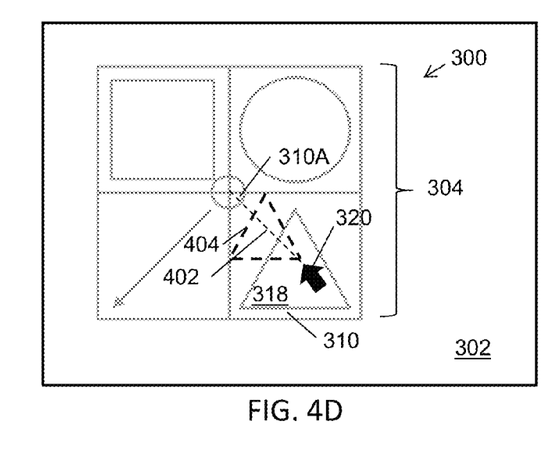

FIG. 4D shows line 402 which represents the path of travel of the cursor 320 from when the cursor 320 moved back into a selection component as shown in FIG. 4C. The cursor 320 traveled through the selection component 310A, and then into the drawing component of the shape selection region 310. The drawing server 104 loads as the currently selected shape the triangle 318 instead of the circle 314, in response to selection of the selection component 310A. When the drawing server 104 receives data indicating the selection of the drawing component of the shape selection region 310, the drawing server 104 displays on the computing devices 102 a representation of the triangle 404.

Figure 4E:
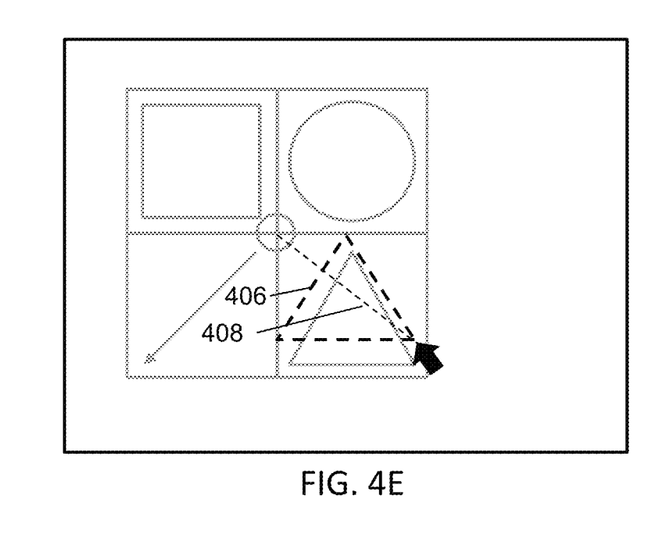
Figure 4F:
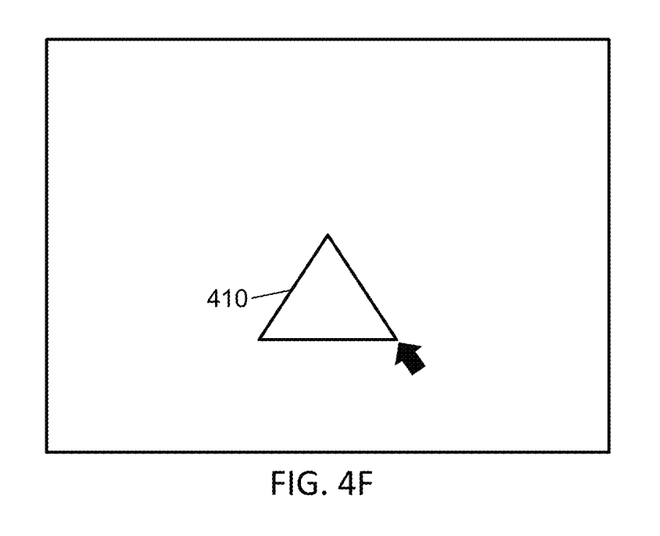

FIG. 4E shows the representation of the triangle 404 from FIG. 4D redrawn to the representation of the triangle 406, which is larger than the representation 404, based on the cursor movement indicated by line 408. FIG. 4F shows that, upon receipt data indicative of a command to draw the shape, the drawing server 104 removes the shape selection component 300 from view, and draws triangle 410.

Referring to FIGS. 4A-4E, for example, the user can invoke the shape selection component 300 by pressing and holding an input device on a touchscreen display. The user can select and draw the representation of the circle 332 as shown in 4B by continuing to hold the input device in contact with the touch screen and moving the input device along the line 330 (e.g., such that the representation 332 is drawn based on the point that invoked the shape selection component 300 and the current location of the input device on the touchscreen relative to the shape selection component 300). The user can select a different shape by moving the input device back into the circle 322 as shown in FIG. 4C while still holding the input device in contact with the touchscreen. The user can select and draw the representation of the triangle 404 as shown in 4D by continuing to hold the input device in contact with the touch screen and moving the input device along the line 402. The user can re-size the representation of the triangle 404 to the representation 406 shown in FIG. 4E by continuing the motion of the input device as shown by the line 408. The user can commit the triangle 410 to the drawing areas as shown in FIG. 4F by removing the input device from contact with the touchscreen.

In some embodiments, rather than having to move back to the center as shown in FIG. 4D to select a new shape, the selected shape can change dynamically as the user moves to different shape selection regions (e.g., such that the cursor 320 can be moved directly from shape selection component 306 to shape selection component 310 without first moving into the circle 322.

Figure 5A:
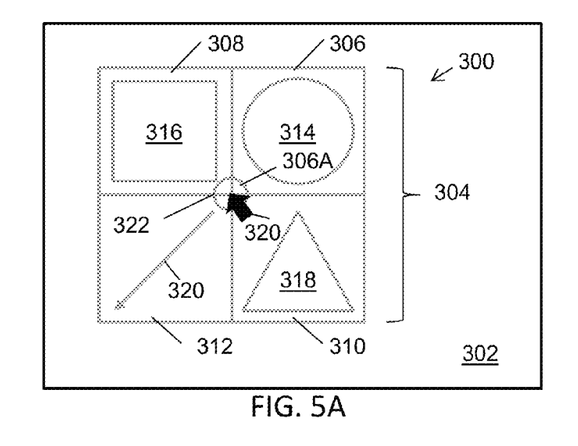
FIGS. 5A-5D are exemplary diagrams of re-drawing a representation of a shape over a different drawing component with minimal user interaction, according to some embodiments.

FIGS. 5A-5D are exemplary diagrams of re-drawing a representation of a shape over a different drawing component with minimal user interaction, according to some embodiments. FIG. 5A shows, similar to FIGS. 3A and 4A, the shape selection component 300 superimposed on the canvas 302. The shape selection component 300 includes a large square portion 304 that defines the outer boundary of the shape selection component. The large square portion 304 includes four small square portions, including shape selection regions 306 and 310 that are inside of the large square portion 304. Shape selection region 306 can be used to draw a circle, as indicated by the circle 314 that is displayed in the shape selection component 300. Shape selection region 308 can be used to draw a square, as shown by the square 316 that is displayed in the shape selection component 300. Shape selection region 310 can be used to draw a triangle, as shown by the triangle 318 that is displayed in the shape selection component 300. Shape selection region 312 can be used to draw an arrow, as shown by the arrow 320 that is displayed in the shape selection component 300.

Figure 5B:
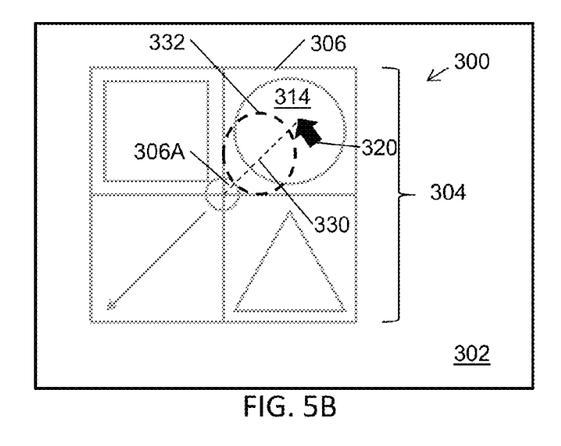

FIG. 5B shows, similar to FIGS. 3B and 4B, line 330 which represents the path of travel of the cursor 320 from when the cursor 320 invoked the shape selection component 300. The cursor 320 traveled first through the selection component 306A, and then into the drawing component of the shape selection region 306. The drawing server 104 loads as the currently selected shape the circle 314. When the drawing server 104 receives data indicating the selection of the drawing component of the shape selection region 306, the drawing server 104 displays on the computing devices 102, in response to the data received in steps 204 and/or 206, a representation of the circle 332.

Figure 5C:
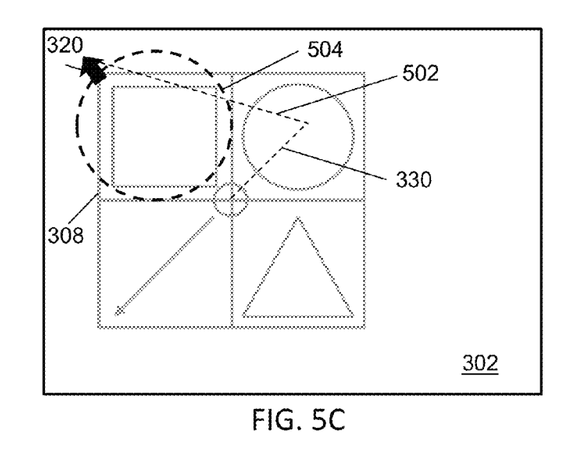
Figure 5D:
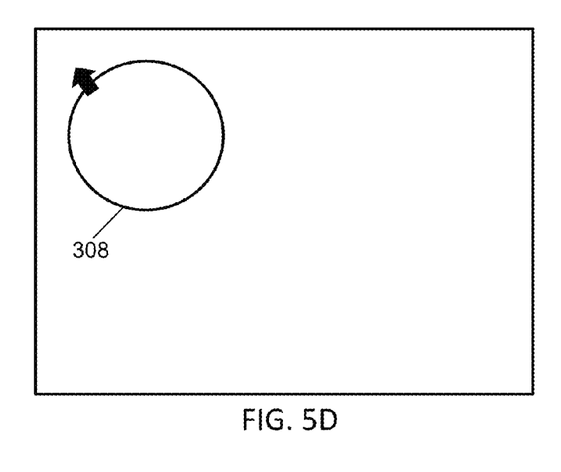

FIG. 5C shows line 502 which is representative of the movement of the cursor 320 from the location of the cursor 320 after the movement represented by line 330. The cursor movement causes the drawing server 104 to re-draw the representation of the circle 504. As shown in FIG. 5C, even though the cursor 320 moved through a different drawing component (e.g., the drawing component 308) and then outside of the outer boundary of the shape selection component 300, the drawing server 104 is configured to re-draw the selected shape (e.g., the circle) based on the location of the cursor. For example, the drawing server 104 can use the center point of the shape selection component as a lower-right corner of a box in which to draw the representation of the circle 504 (e.g., which is not drawn on the canvas 302), and the cursor 320 location as the upper-left corner of the box. Since the cursor did not move into a selection component of the shape selection regions, the drawing server 104 continues to re-draw the representation of the circle 504 based on movement of the cursor 320 as the second point (e.g., where the first point is the center of the shape selection component 300). At FIG. 5D, the drawing server 104 receives data indicative of a command to draw the circle, and draws circle 506.

Referring to step 236, the drawing server 104 can receive data that is indicative of a command to remove the selection component. For example, the shape selection component 300 can be configured such that a user can cancel a drawing action without drawing a shape. In some embodiments, a drawing operation can be cancelled by an action within one or more of the selection components of the shape selection components. Referring to FIG. 3A, for example, if a user clicks and holds a button on their computer mouse to invoke the shape selection component 300, the user can depress the button immediately to remove the shape selection component 300 without drawing a shape (e.g., since the cursor has not moved from within the circle 322 that defines the selection regions of the shape selection component). As another example, if a user clicks a mouse button to invoke the shape selection component 300, the user can click a mouse button with the cursor inside of the circle 322 to remove the shape selection component without drawing a shape. As another example, if a user places an input device in contact with a touchscreen to invoke the shape selection component 300, the user can remove the input device while it is within the circle 322 to remove the shape selection component without drawing a shape.

The shape selection component 300 can be configured such that once a user starts a drawing action, the user can still cancel the drawing action without drawing a shape. For example, referring to FIG. 3B, the user started a drawing action by causing the drawing server 104 to draw the representation of the circle 332. The user can cancel the drawing action by returning the cursor to within the circle 322 (e.g., and clicking the mouse button, depressing the mouse button if it was pressed, etc.).

In some embodiments, the computerized whiteboard can receive drawing commands from any of the computing devices 102, and once drawn, the drawing server 104 updates the display of each of the computing devices 102 to show the shape. In some embodiments, the shape selection component, the representations of the shapes, or both are only displayed on the computing device 102 that invoked the drawing action. The drawing server 104 can assign each of the computing devices 102 a user identifier for the whiteboard program (e.g., which each user can customize to set their name, etc.).

In some embodiments, the computerized whiteboard program can be implemented using JavaScript that is loaded to the browsers running on the computing devices 102 from the drawing server 104 (e.g., which can be located on a cloud service provider that serves to the computing devices 102). As the computing device 102 receives data indicative of a drawing action, the JavaScript can be configured to capture the movements (e.g., mouse movements, input device movements on a touchscreen, etc.) and draw the representations of the shapes directly to a scalable graphics canvas in JavaScript on the invoking computing device 102.

Once the computing device 102 receives data indicative of a command to draw the shape (e.g., a user removing their finger from a touchscreen as described above with respect to FIGS. 3D, 4F and 5D), the drawing can be committed to the canvas, and information can be sent from the computing device 102 to the drawing server 104 (e.g., via a TCP packet) so that the remaining computing devices 102 receive a drawing update with the new shape so it is displayed on all of the computing devices 102.

The JavaScript program can use a document object model to add shapes as a separate element to the graphics canvas so they can be moved even after being drawn to the canvas (e.g., after the representation is drawn as an actual shape). For example, the user may be able to select a movement tool to move shapes drawn on the canvas. When moving items, once a computing device 102 receives data indicative of selecting a shape to move, the computing device 102 can tell the drawing server 104 to notify other computing devices 102 to get ready for movement. The computing device 102 invoking the movement action can send update data (e.g., ping packets) with updated movement information for the shape, and the drawing server 104 can send updates (e.g., ping packets) to each of the computing devices 102. When the invoking computing device 102 finishes moving the shape, the computing device 102 sends another packet (e.g., a TCP packet) to the drawing server 104 indicating the computing device 102 is done moving the shape and the shape is then committed on the canvas to instruct the remaining computing devices 102 of the final position of the shape. The drawing server 104 can keep a history for all objects for a particular white page session so if a computing device joins half-way through the session, the computing device is sent all the items on the canvas.

The drawing server 104 can also be configured to delete drawn shapes from the canvas. For example, the drawing server 104 can be configured to delete shape by dragging the shape to a recycle bin, clicking the recycle bin and selecting the shape(s) to delete, or pressing recycle to delete all shapes on the canvas, etc. As another example, the drawing server 104 can include an undo button that can undo (or delete) shapes one at a time. For example, the drawing server 104 can be configured to undo shapes in the order that they were drawn (e.g., the first click of the undo button deletes the most recent shape, the second click of the undo button deletes the next most recent shape, and so on).

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A computerized method for drawing shapes, the method comprising:
    displaying, by a computing device, a drawing area;
    displaying, by the computing device, a shape selection component comprising:
    a large square portion that defines an outer boundary of the shape selection component; and
    four small square portions inside of the large square portion, wherein each of the small square portions are connected by a selection component at the center, each small square portion represents a shape selection region from a set of shape selection regions, each shape selection region being associated with a shape that can be drawn on the drawing area and comprising:
    the selection component for selecting the shape associated with the shape selection region; and
    a drawing component for initiating a drawing of the shape associated with the shape selection region;
    receiving, by the computing device, first data indicative of a selection of a first selection component of a first shape selection region from the set of shape selection regions;
    receiving, by the computing device, second data indicative of a selection of a first drawing component of the first shape selection region; and
    drawing, by the computing device in response to the first data and the second data, a representation of a first shape associated with the first shape selection region on the drawing area, wherein the representation can be manipulated.

2. The method of claim 1, further comprising:
    receiving third data indicative of a command to draw the representation of the first shape;
    drawing the first shape on the drawing area such that the drawing of the first area cannot be manipulated; and
    removing the shape selection component from the drawing area.

3. The method of claim 1, further comprising:
    receiving third data indicative of a command to move the representation of the first shape; and
    re-drawing the representation of the first shape based on the third data.

4. The method of claim 1, further comprising:
    receiving third data indicative of a selection of a second selection component of a second shape selection region from the set of shape selection regions; and
    removing the representation of the first shape from the drawing area.

5. The method of claim 4, further comprising:
    receiving fourth data indicative of a selection of a second drawing component of the second shape selection region; and
    drawing a second representation of a second shape associated with the second shape selection region on the drawing area such that the second representation can be manipulated.

6. The method of claim 4, further comprising:
    receiving fifth data indicative of a command to remove the shape selection component from the drawing area; and
    removing the shape selection component from the drawing area.

7. The method of claim 1, wherein displaying the four small square portions comprises displaying each of the small square portions such that:
    a first side and a second side of the small square portion are along the outer boundary of the shape selection component;
    a third side of the small square portion is along a side of a first small square portion from the four small square portions; and
    a fourth side of the small square portion is along a side of a second small square portion, such that each of the four small square portions all include a corner that meets with a corner from each of the remaining small square portions at a center of the shape selection component.

8. The method of claim 7, further comprising drawing a circle about the center of the shape selection component, such that:

a portion of each of the four small square portions within the circle defines the selection component for selecting the shape associated with the shape selection region; and a remaining portion of each of the four small square portions not within the circle defines the drawing component for initiating a drawing of the shape associated with the shape selection region, such that:

the first data indicative of the selection of the first selection component of the first shape selection region is generated by a selection of a first portion of a first small square portion within the circle for the first shape selection region; and the second data indicative of the selection of the first drawing component of the first shape selection region is generated by a selection of a first remaining portion not within the circle for the first shape selection region.

9. The method of claim 1, further comprising:
receiving third data indicative of a command to display the shape selection component, wherein the command is generated by a mouse click, a finger press on a touchscreen, or any combination thereof; and
displaying the shape selection component on the drawing area at a location determined based on the third data.

10. The method of claim 1, further comprising:
displaying a component configured to change a first set of shapes associated with the shape selection component;
receiving third data indicative of a selection of the component; and
updating the set of shape selection regions so that each shape selection region is associated with a shape from a second set of shapes that is different from the first set of shapes.

11. The method of claim 1, wherein receiving first data indicative of the selection of the first selection component of the first shape selection region from the set of shape selection regions comprises receiving data indicative of a mouse cursor moving over the first selection component, a touchscreen display sensing an object moving over the first selection component, or any combination thereof.

12. A computing device for drawing shapes, a server comprising:
a database; and
a processor in communication with the database, and configured to run a module store din memory that is configured to cause the processor to :
display a drawing area;
display a shape selection component comprising:
a large square portion that defines an outer boundary of the shape selection component; and
four small square portions inside of the large square portion, wherein each of the small square portions are connected by a selection component at the center, each small square portion represents a shape selection region from a set of shape selection regions, each shape selection region being associated with a shape that can be drawn on the drawing area and comprising:
the selection component for selecting the shape associated with the shape selection region; and
a drawing component for initiating a drawing of the shape associated with the shape selection region;
receive first data indicative of a selection of a first selection component of a first shape selection region from the set of shape selection regions;
receive second data indicative of a selection of a first drawing component of the first shape selection region; and
draw in response to the first data and the second data, a representation of a first shape associated with the first shape selection region on the drawing area, wherein the representation can be manipulated.

13. The system of claim 12, wherein the module is further configured to cause the processor to:
receive third data indicative of a command to draw the representation of the first shape;
draw the first shape on the drawing area such that the drawing of the first area cannot be manipulated and to store the first shape in the database; and
removing the shape selection component from the drawing area.

14. The system of claim 12, wherein the module is further configured to cause the processor to:
receive third data indicative of a command to move the representation of the first shape; and
re-draw the representation of the first shape based on the third data.

15. The system of claim 12, wherein displaying the four small square portions comprises displaying each of the small square portions such that:
a first side and a second side of the small square portion are along the outer boundary of the shape selection component;
a third side of the small square portion is along a side of a first small square portion from the four small square portions; and
a fourth side of the small square portion is along a side of a second small square portion, such that each of the four small square portions all include a corner that meets with a corner from each of the remaining small square portions at a center of the shape selection component.

16. The system of claim 15, wherein the module is further configured to cause the processor to draw a circle about the center of the shape selection component, such that:
a portion of each of the four small square portions within the circle defines the selection component for selecting the shape associated with the shape selection region; and
a remaining portion of each of the four small square portions not within the circle defines the drawing component for drawing the shape associated with the shape selection region.

17. A non-transitory computer readable medium having executable instructions operable to cause an apparatus to:
display a drawing area;
display a shape selection component comprising:
a large square portion that defines an outer boundary of the shape selection component; and
four small square portions inside of the large square portion, wherein each of the small square portions are connected by a selection component at the center, each small square portion represents a shape selection region from a set of shape selection regions, each shape selection region being associated with a shape that can be drawn on the drawing area and comprising:
the selection component for selecting the shape associated with the shape selection region; and
a drawing component for initiating a drawing of the shape associated with the shape selection region;
receive first data indicative of a selection of a first selection component of a first shape selection region from the set of shape selection regions;
receive second data indicative of a selection of a first drawing component of the first shape selection region; and
draw, in response to the first data and the second data, a representation of a first shape associated with the first shape selection region on the drawing area, wherein the representation can be manipulated.

* * * * *